(12) United States Patent
Reif et al.

(10) Patent No.: US 11,453,147 B2
(45) Date of Patent: Sep. 27, 2022

(54) METHOD FOR PRODUCING A COMPOSITE COMPONENT FORMED WITH A FIBRE-REINFORCED PLASTIC COMPONENT ON WHICH AT LEAST ONE SURFACE WITH A COATING IS FORMED

(71) Applicant: Fraunhofer-Gesellschaft zur Foerderung der angewandten Forschung e.V., Munich (DE)

(72) Inventors: Manuel Reif, Dresden (DE); Stefan Scheitz, Dresden (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 17/019,710

(22) Filed: Sep. 14, 2020

(65) Prior Publication Data

US 2021/0078206 A1 Mar. 18, 2021

(30) Foreign Application Priority Data

Sep. 12, 2019 (DE) ...................... 10 2019 213 905.1

(51) Int. Cl.
*C23C 4/02* (2006.01)
*B29B 11/16* (2006.01)
(Continued)

(52) U.S. Cl.
CPC ................ *B29B 11/16* (2013.01); *C08J 5/24* (2013.01); *C23C 4/08* (2013.01); *C23C 4/129* (2016.01); *C08J 2300/12* (2013.01)

(58) Field of Classification Search
None
See application file for complete search history.

(56) References Cited

U.S. PATENT DOCUMENTS

| | | | |
|---|---|---|---|
| 4,675,205 A | 6/1987 | Boncoeur et al. | |
| 6,645,610 B1 | 11/2003 | Reis et al. | |

(Continued)

FOREIGN PATENT DOCUMENTS

| | | |
|---|---|---|
| EP | 0375914 | 7/1990 |
| WO | 2018/200053 | 11/2018 |
| WO | 2019/126314 | 6/2019 |

OTHER PUBLICATIONS

German Examination Report.

*Primary Examiner* — Jeffry H Aftergut
(74) *Attorney, Agent, or Firm* — Jacobson Holman PLLC

(57) ABSTRACT

At least one surface of a FRP component is coated by impregnating a structure formed with textile fibres with a flowable polymeric matrix material so the fibres are completely covered to form the coating, a thickness of the flowable polymeric matrix material above the fibres of at least 100 μm and at least one ply of pull-off fabric, mesh or gauze is laid on and wetted or impregnated completely with the flowable polymeric matrix material. The polymeric matrix material is cured then the at least one ply of pull-off fabric, mesh or gauze is removed by peeling and in this region a surface of increased roughness is obtained so between the surface of increased roughness and fibres there is a layer formed with the cured polymeric matrix material, having a thickness of at least 100 μm. Coating the increased roughness surface with a thermal spraying process.

7 Claims, 1 Drawing Sheet

(51) Int. Cl.
*C23C 4/129* (2016.01)
*C08J 5/24* (2006.01)
*C23C 4/08* (2016.01)

(56) References Cited

U.S. PATENT DOCUMENTS

2020/0131615 A1* 4/2020 Crawmer ................. C23C 4/02
2020/0198313 A1* 6/2020 Wallick ................... B29C 66/02
2021/0283891 A1* 9/2021 Macadams .............. B32B 27/38

* cited by examiner

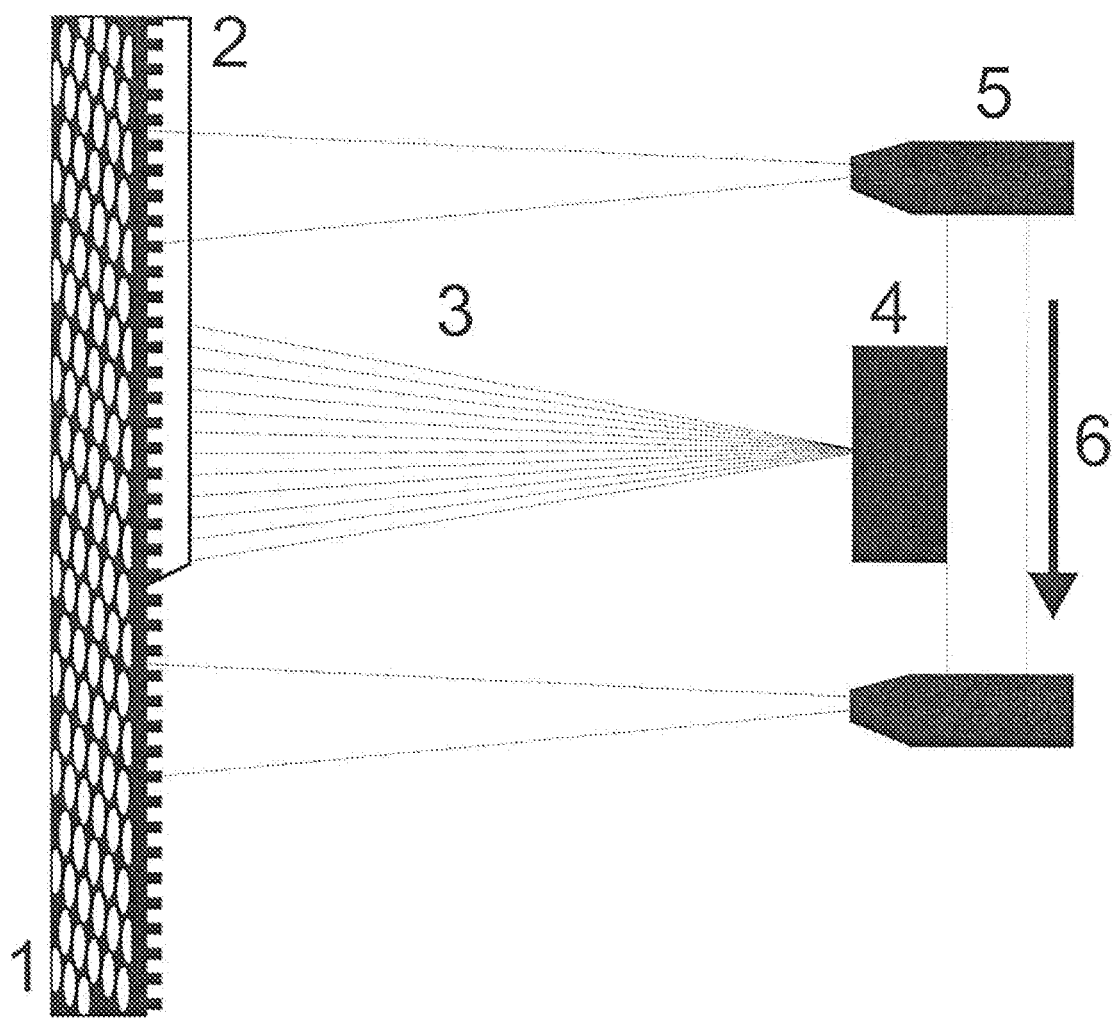

METHOD FOR PRODUCING A COMPOSITE COMPONENT FORMED WITH A FIBRE-REINFORCED PLASTIC COMPONENT ON WHICH AT LEAST ONE SURFACE WITH A COATING IS FORMED

BACKGROUND OF THE INVENTION

The invention relates to a method for producing a composite component which is formed with a fibre-reinforced plastic component (FRP component) on which at least one surface with a coating is formed.

The coating of fibre-reinforced plastic (FRP) by means of thermal spraying is possible only with suitable surface preparation. A precondition for successful coating is a sufficient roughness, in order to ensure the mechanical engagement of the film-forming particles sprayed.

A wide variety of different processes are known that can be employed in order to prepare the surface of non-metallic components (including those of FRP) for thermal spraying. The surface preparation techniques employed to date can be broken into the following categories: chemico-physical, thermal, and mechanical. The process established in the case of metallic materials is that of sandblasting, to roughen the component surface for thermal spraying. This process is currently employed for non-metallic materials as well, despite studies having shown that the sandblasting induces strength-reducing damage in the substrates that are to be coated.

All of the processes employed to date are applied only after the manufacturing operation, before the coating procedure. They operate primarily on the principle of ablating material from the surface, by various mechanisms, and roughening this surface.

WO 2018/200053 A1 discloses a technical solution that is aimed at complete removal of the polymer matrix of which an FRP component is formed. By this means it is said to be possible to join the spray addition materials directly to the fibres, allowing layer adhesion to occur directly to fibres by diffusion and Van-der-Waals forces. The aim here is to form, between the layer and the fibre material, an interphase of silicates (where the base material is GRP) or carbides (where the base material is CRP).

Pull-off fabrics known as peel plies are already established in the sector of FRP parts manufacture, in order to prepare the surface for further working steps, such as adhesive bonding or coating. A pull-off fabric is understood to be a woven fabric which is applied as the final ply during laminate manufacture. By means of this fabric, excess laminating resin is removed from the laminate and the surface is roughened. This pull-off fabric, by virtue of its widespread use in component manufacture in aerospace and in lightweight construction, is a conventional purchased part which can be acquired in different versions from a variety of manufacturers. This pull-off fabric may consist of polyamides (e.g. nylon) or polyesters. The most widespread pull-off fabrics, however, are those of nylon. The pull-off fabrics are available from the manufacturers in different versions. These different versions are distinguished according to their weave pattern (in particular, twill or plain weave) and their basis weight (around 64-100 g/cm$^2$).

The basic functioning and also the elementary properties, however, are the same across all of the stated embodiments. The pull-off fabric is impregnated with the matrix material and can be peeled from the component surface with little force. The pattern that is left in the component surface is dependent directly on the pull-off fabric used. Through a suitable selection of the pull-off fabric it is possible to adjust the surface structure and also the degree of roughness.

SUMMARY OF THE INVENTION

It is an object of the invention, therefore, to provide possibilities for the production of composite components wherein a coating is formed by means of a thermal spraying process on a surface of an FRP component, this coating exhibiting improved adhesion, and the composite component exhibiting enhanced strength.

This object is achieved in accordance with the invention by a method as seen in all the claims.

In the method, a structure formed with textile fibres is impregnated with a flowable polymeric matrix material such that the fibres are completely surrounded by the flowable polymeric matrix material, and, in the region of the surface that is provided with the coating, a thickness of the flowable polymeric matrix material above the fibres of at least 100 µm is maintained, and there at least one ply of a pull-off fabric, a mesh or a gauze is placed on and is impregnated completely with the flowable polymeric matrix material.

A flowable polymeric matrix material ought in this case to have a viscosity enabling it to penetrate into interstices of fibres in the textile structure. This may be achieved with pressure assistance. In that case, for example, infiltration may be achieved by means of sub-atmospheric pressure.

A textile structure may be, for example, a woven fabric, a knitted fabric or else a laid fibre scrim.

During impregnation it should be ensured that there is no wetting of the upper ply. The surface of gauzes and meshes may be treated by application of a release agent (e.g. liquid release wax) prior to impregnation with the flowable polymeric matrix material, in order to improve the peel behaviour. Pull-off fabrics of nylon, for example, are not wetted by the polymeric matrix material, and in this case, therefore, it is not absolutely necessary to use a release agent. At least complete impregnation of the pull-off fabric, a mesh or a gauze ought to be avoided, in order to enable low-force peeling from the surface, without any damage to the underlying layers of the polymeric matrix material.

Thereafter the polymeric matrix material, more particularly a polymeric resin, is cured, and then the at least one ply of a pull-off fabric, a mesh or a gauze is removed by peeling. In this region, consequently, a surface of increased roughness is obtained, such that between the surface of increased roughness and the fibres there is a layer which is formed with the cured polymeric matrix material and which has a thickness of at least 100 µm. The fibres are therefore covered completely by the cured polymeric matrix material.

The coating is subsequently applied by means of a thermal spraying process in the region of the surface of increased roughness.

Advantageously, a thickness of the layer formed with the flowable polymeric matrix material above the fibres of between 100 µm to 500 µm, and/or a thickness of the layer formed with the cured polymeric matrix material of between 100 µm to 500 µm, ought to be maintained.

After the curing of the polymeric matrix material and before the formation of the coating, a thermal treatment may be carried out at a temperature which is greater than the temperature at which the spraying material impinges on the surface of increased roughness. This temperature ought to be at least 5% greater than the temperature at which the spraying material impinges on the surface of increased roughness.

It is also possible to use a ply of a pull-off fabric, a mesh or a gauze which has cut-outs. Accordingly, locally defined regions with and without a roughened surface can be formed on the respective surface of the FRP component, and then only regions with increased surface roughness can be provided with a coating by means of thermal spraying. Accordingly, local adaptations can be achieved to the desired functionality of a composite component produced in accordance with the invention.

One possibility for roughening the surface of FRP components without adversely affecting the substrate properties for thermal spraying is to use pull-off fabric or a structural element of similar embodiment, such as a network, a mesh structure or a gauze, which may consist of polymeric materials or else of metal. Below, the term "pull-off fabric" is intended to refer to such structural elements as well.

It is therefore possible to use mesh structures as structural elements which, similarly to the pull-off fabric, can be peeled from the surface after the laminating procedure. Suitable in this context, for example, are mesh mats of plastics or metals which have mesh sizes of around 1 µm to 50 µm and also a thickness of around 10 µm to 100 µm. Instead of mesh structures it is also possible for gauzes to be used which have the same properties, in terms of geometric dimensions and material, as the stated mesh structures.

In order to be able to ensure layer attachment, it is made sure that the polymeric matrix of the FRP component still has a sufficient thickness after the removal of the pull-off fabric. The thickness of the matrix layer after the removal of the respective pull-off fabric above the fibre structure of the respective FRP component is for this purpose to be at least 100 µm, so making it possible to ensure that, during the thermal spraying procedure, no fibres are exposed and/or damaged or destroyed.

The maximum thickness of the matrix material is guided by the process used and may be up to several millimetres; however, for reasons of weight, the excess polymeric matrix material ought to be selected to be as little as possible. The remaining matrix material thickness after the removal of the pull-off fabric, above the fibres of the respective FRP component, is to be in the 100 µm to 500 µm range. This can be achieved preferably by impregnating the pull-off fabric completely with the polymeric matrix material during the manufacture operation of an FRP component. In this way it can be ensured that, after removal of the pull-off fabric, no fibres have been entirely or partly exposed. For reliable layer attachment of the thermal spray layer, the fibres must not be exposed at any point, since the spraying process may affect such fibres, leading to a deterioration in particular in the mechanical substrate properties.

In the case of the established methods stated above, it is frequently necessary to weigh the effort and/or costs against the surface quality attainable. Often, for reasons of cost, a reduced surface quality is accepted. Because the surface pretreatment with pull-off fabric is a very cost-effective method, and one already established in the industry, in the manufacture of FRP components, a great potential would arise through the use of pull-off fabric if the quality of the layer attachment in thermal spraying corresponds at least to that of established methods originally used, such as sandblasting.

In order to prepare the surface in accordance with the invention, FRP components are produced, for example, by a hand lay-off lamination or prepreg method, if the last fabric ply applied being a pull-off fabric, a mesh or a gauze. After the curing of the laminate resin as polymeric matrix material, directly before the coating procedure, for example, this ply or these plies is or are peeled from the surface to be coated, and this surface can then be cleaned using ethanol.

This is followed by coating by means of thermal spraying. After the curing of the polymeric matrix material, the FRP components thus treated can be treated thermally by heat treatment. The thermal treatment ought to be carried out at a temperature which corresponds to the maximum surface temperature in the spraying process (e.g. in the case of APS: ~70° C.), but where possible ought to be at least 5% greater than this maximum temperature. It should additionally be ensured that this temperature is not exceeded during the spraying process used. Accordingly, the respective coating process ought to be selected specifically. Moreover, the respective process parameters ought to be adapted accordingly to the FRP component thus prepared, in order to prevent damage to the component. Possible adaptation options on the process side include component cooling, the spraying distance, the quantities (and pressures) of process gas used, the spraying material used to form the coating (including conveying rate and feed technique), and also, where applicable, parameters of the power supply (electrical voltage and current strength). By means of these parameters it is possible to adjust the spraying process such that there is no damage to the FRP component and particular the fibres. The primary mechanisms of the damage processes may be on the one hand thermal overloading and on the other hand the damage due to the high velocity of the sprayed particles. The thermal damage can be ascertained by continuous monitoring of the component surface temperature during the spraying process, and thermal damage can be ascertained after the spraying process through discolouration of the fibres and/or the matrix material.

If the particle velocity selected is too high and so causes component damage, this can be ascertained from an ablation at the surface (similar to sandblasting). Component cooling may also be an important aspect in component manufacture. This cooling may be applied either directly at the spray gun used for thermal spraying, or as external cooling directly on the FRP component (from the front or back sides). The cooling performance required ought to be tailored to the particular FRP component and ought to be monitored during the process. It must be sufficient to rule out the possibility of any temperature-induced damage to the FRP component in the course of thermal spraying.

In accordance with the invention there is no complete removal of the polymeric matrix material and no exposing of fibres. The surface of the polymeric matrix material that is to be coated is merely roughened. Layer adhesion is accomplished primarily through mechanical interengagement. Other binding mechanisms, such as Van-der-Waals forces and diffusion events, are negligible here.

Besides the process of atmospheric plasma spraying (APS) with aluminium powder, the invention may also use other thermal spraying processes and spray addition materials (e.g. polymers such as thermoplastics, low-melting metals, such as Ni-alloys (especially NiAl, NiCr), aluminium, copper or bronze, brass, and also ceramics with a bondcoat beforehand) which are suitable in principle for FRP coating. Examples of suitable thermal spraying methods are atmospheric plasma spraying, arc wire spraying, high-speed flame spraying, or flame spraying. The spraying material with which the coating is formed may be supplied to the operation, process-dependently, as powder, wire, string, rod, suspension or solution.

In the method of the invention, the procedure for producing an FRP component may be such that pull-off fabric, mesh structure or gauze is placed on as the last ply in the hand lay-up lamination or prepreg process. This ply is completely impregnated or completely wetted with the polymeric matrix material. After the curing of the polymeric matrix material, the ply is peeled from the surface and leaves behind a reproducible, uniformly distributed surface structure for the subsequent coating by means of thermal spraying.

A pull-off fabric ought to be used with an individual-filament width of 10 µm to 50 µm and a fibre-bundle width of 100 µm to 1000 µm; a mesh structure or gauze ought to be used with a mesh size of 1 µm to 50 µm and a thickness of 10 µm to 100 µm.

The thickness of the residual matrix material layer above the fibres of the respective FRP component, before the placement of the last ply, is to be at least 100 Linn (distance of surface to fibres), so that none of the fibres are exposed during peeling. The thickness of the residual matrix material layer here is influenced by the amount of matrix material used in the production of the FRP component. After the peeling of the pull-off fabric, the mesh structure or the gauze, the residual matrix material layer ought advantageously to have a thickness in the range from 100 µm to 500 µm.

After the peeling, the coating can take place by thermal spraying.

The coating parameters ought to be selected such that the surface temperature is below the thermal decomposition temperature of the polymeric matrix material or, in the case of a heat treatment planned after the thermal coating, below this heat treatment temperature. For this purpose, substrate cooling can be employed during coating, using nozzles, with compressed air or $CO_2$. Compressed air or $CO_2$ may to this end be directed onto a surface of the FRP component that is situated directly adjacent to a region in which the thermal spraying is being carried out at this point in time. Compressed air or $CO_2$ may also be directed at the surface of the FRP component which is opposite the surface where thermal coating is taking place momentarily.

Furthermore, damage to the substrate surface during the formation of the coating can be minimized by increasing the spraying distance and/or reducing the thermal and kinetic energy in the process (temperature and velocity on impingement of the particles). If the spraying distance is increased, there is an increase in distance between an exit nozzle of a spraying tool or spray gun and the surface of increased roughness.

Depending on the spraying material to be applied and on the spraying method used, powders with particle sizes of between 5 µm and 100 µm can be employed. It is possible, for example, to use metallic aluminium powder having a particle size distribution of −75+45 µm, or ceramic aluminium oxide having a particle size distribution of −40+10 µm, in the case of atmospheric plasma spraying (both distributions indicated with $d_{90}$-$d_{10}$).

In the case of an adaptation to the coating parameters in order to reduce the surface temperature on the FRP component, on the basis of the atmospheric plasma spraying of Al powder onto CRP, the possibilities include an increased number of cooling nozzles, cooling of $CO_2$ instead of with compressed air, an increase in the spraying distance from the surface to be coated by up to 50 mm relative to the standard distance typically maintained in atmospheric spraying, a reduction in the hydrogen fraction in the plasma gas of up to 30% from the standard, and a reduction in the electrical current strength of up to 75% in comparison to the typical spraying parameters, taking account of the respective spraying material.

When the invention is employed, there is no need for any costly and inconvenient additional step of working. Not only the additional placement of the ply of pull-off fabric, but also the removal thereof before the spraying process, do not represent any significant loss of time during component manufacture. Moreover, the trials conducted showed that the adhesion is improved when using pull-off fabric, mesh or gauze, in comparison to the established methods.

A further advantage arises in the fact that the pull-off fabric, mesh or gauze can be employed very flexibly. By trimming the pull-off fabric, mesh or gauze it is possible to form defined regions with and without a roughened surface, and so to confine the actual coating region to the surface of the respective FRP component in a defined way. Accordingly it is possible to model complex contours or patterns as a coating, on a correspondingly prepared FRP component, as a layer. A locally defined, selected formation of a thermal spray coat on a component surface is possible, which corresponds to the desired functionality of a ready-produced composite component.

The invention results in possibilities for use in all fields of application of thermal spraying on FRP components: heating layers (e.g. for de-icing applications or as cabin heating in aircraft and cars), insulation layers or anti-wear layers, and topcoats. In principle it is possible in future for a multiplicity of further possible applications to arise, if progressive research makes it possible to replace metallic components with fibre-reinforced plastics under more demanding ambient conditions as well. As a result there is a potential for saving in all sectors of industry, but especially in sectors where lightweight construction and weight savings are important. One possible example of this is that of aerospace, although a high potential for saving can also be derived in the automotive engineering sector or in the development of wind turbines.

DESCRIPTION OF THE DRAWING

Below, an illustrative explanation will be given of a construction of the kind that can be used in the context of thermal spraying.

In the drawing:

FIG. 1 shows in schematic form one possible arrangement which can be employed in the formation of a coating by means of thermal spraying.

DETAILED DESCRIPTION OF THE INVENTION

An explanation has been given here, as in the general part of the description, of how a region of a surface of an FRP component 1 was treated by peeling so as to achieve an increased surface roughness there.

From the exit nozzle of a spray gun 4, by means of thermal spraying, a particle jet 3 is accelerated in the direction of the surface of increased roughness, so that this surface is coated with the particle material. The spray gun 4 is moved at a constant speed in the direction 6 of advance movement. As a result, the coating 2 is formed.

During this procedure, the FRP component 1 is cooled by an arriving flow of $CO_2$ or compressed air from the cooling nozzles 5 which are arranged on the spray gun 4, and so the composite component is not harmed, let alone damaged, by the elevated temperatures accompanying the thermal spraying.

The invention claimed is:

1. Method for producing a composite component constructed from a fibre-reinforced plastics component FRP on which at least one surface with a coating is formed, consisting of the steps of:
impregnating a structure formed with textile fibres with a flowable polymeric matrix material such that the textile fibres are completely covered by the flowable polymeric matrix material and in a region of the surface that is to be provided with coating, a thickness of the flowable polymeric matrix material above the textile fibres of at least 100 µm is maintained; providing at least one ply of a pull-off fabric, a mesh or a gauze to be laid on and wetted or impregnated completely with the flowable polymeric matrix material then curing the polymeric matrix material and the at least one ply of the pull-off fabric, mesh or gauze is removed by peeling and consequently in this region a surface of increased roughness is obtained such that between the surface of increased roughness and the textile fibres there is a layer formed with the cured polymeric matrix material, having a thickness of at least 100 µm and no textile fibers are exposed and subsequently the coating on the cured polymeric matrix is applied in the region of the surface of increased roughness by means of a thermal spraying process.

2. The method according to claim 1, maintaining the thickness of the layer formed with the flowable polymeric matrix material above the textile fibres of between 100 µm to 500 µm or the thickness of the layer formed with cured polymeric matrix material of between 100 µm and 500 µm above the textile fibres.

3. The method according to claim 1, using the pull-off fabric having a single-filament width of 10 µm to 50 µm, a fibre-bundle width of 100 µm to 1000 µm, the mesh structure or gauze having a mesh size of 1 µm to 50 µm and a thickness of 10 µm to 100 µm.

4. The method according to claim 1 consisting of the further step of applying a release agent to the surface of the mesh or the gauze before impregnating with the flowable polymeric matrix material.

5. The method according to claim 1, after the curing of the polymeric matrix material and before the formation of the coating, consisting of the further step of thermally treating with a temperature which is greater than the temperature at which the thermally sprayed material impinges on the surface of increased roughness, the temperature being at least 5% greater than the temperature at which the thermally sprayed material impinges on the surface of increased roughness.

6. The method according to claim 1, the thermal spraying process is atmospheric plasma spraying, arc wire spraying, high-speed flame spraying or flame spraying and the spraying material applied by the thermal spraying process is supplied to the operation, process-dependently as powder, wire, string, rod, solution or suspension.

7. The method according to claim 1 using a ply of a pull-off fabric, a mesh or a gauze with cut-outs, and forming locally defined regions with and without surface roughening, and only regions of increased surface roughness are provided with a coating by means of the thermal spraying process.

* * * * *